Figure 1:
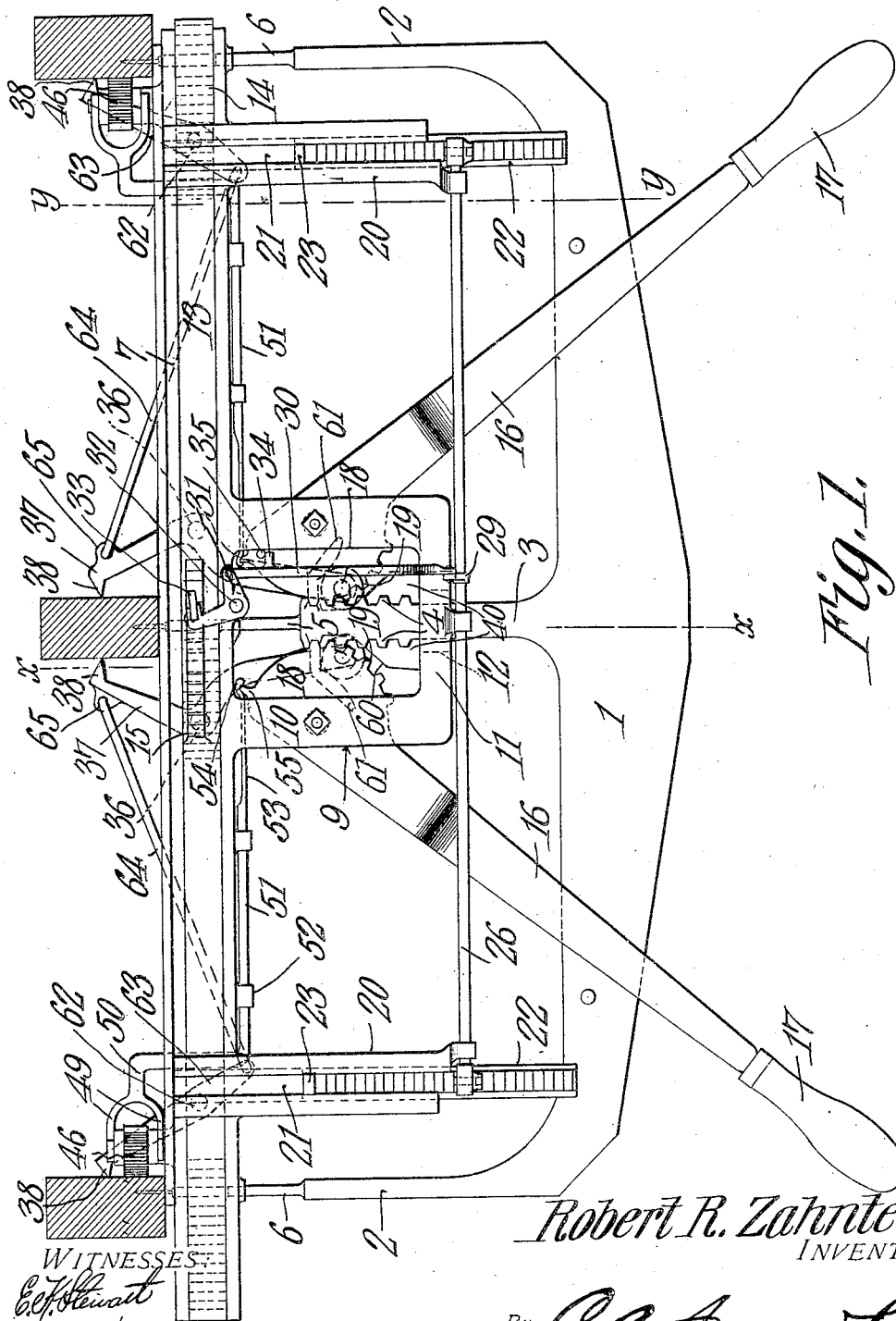

No. 879,995.

PATENTED FEB. 25, 1908.

R. R. ZAHNTER.
LATHING MACHINE.
APPLICATION FILED APR. 19, 1907.

2 SHEETS—SHEET 1.

Robert R. Zahnter,
INVENTOR.

WITNESSES

By C. A. Snow & Co.
ATTORNEYS

No. 879,995. PATENTED FEB. 25, 1908.
R. R. ZAHNTER.
LATHING MACHINE.
APPLICATION FILED APR. 19, 1907.
2 SHEETS—SHEET 2.
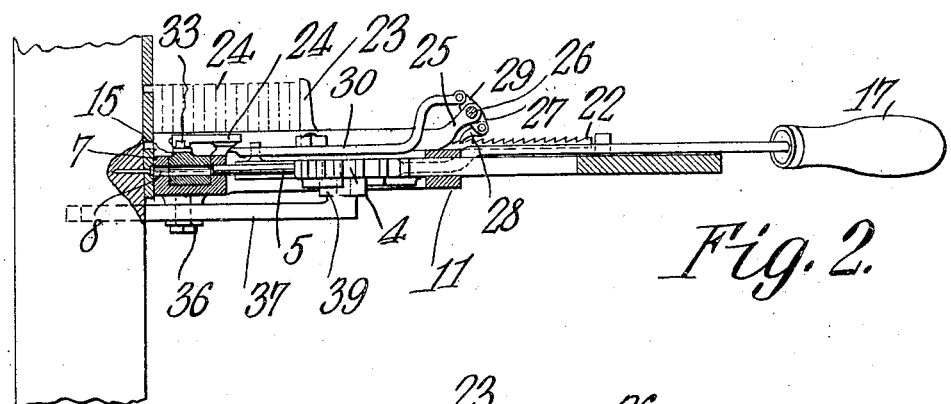
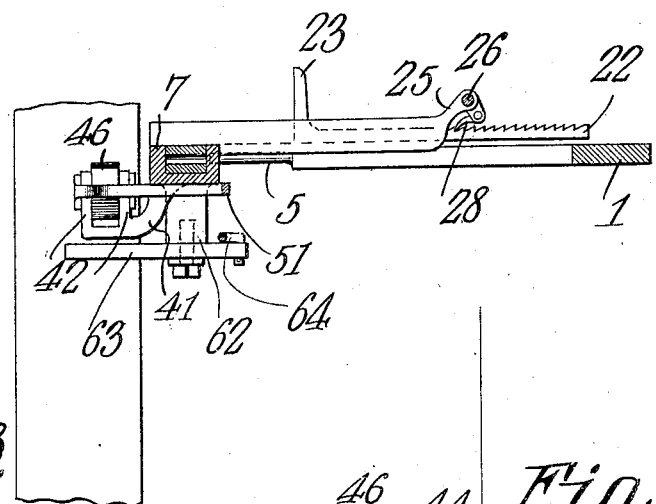
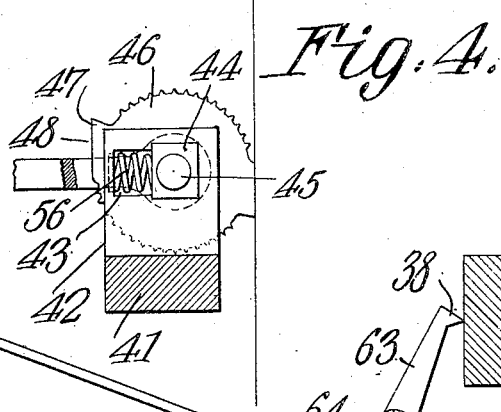
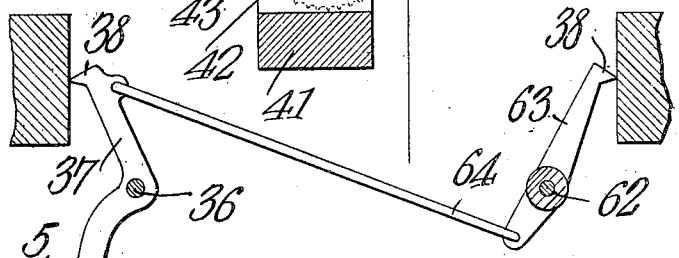
Robert R. Zahnter,
INVENTOR.
WITNESSES:
E. J. Stewart
F. T. Chapman
By C. A. Snow & Co.
ATTORNEYS

UNITED STATES PATENT OFFICE.

ROBERT R. ZAHNTER, OF FRUIT, ILLINOIS.

LATHING-MACHINE.

No. 879,995.     Specification of Letters Patent.     Patented Feb. 25, 1908.

Application filed April 19, 1907. Serial No. 369,142.

*To all whom it may concern:*

Be it known that I, ROBERT R. ZAHNTER, a citizen of the United States, residing at Fruit, in the county of Madison and State of Illinois, have invented a new and useful Lathing-Machine, of which the following is a specification.

This invention has reference to improvements in lathing machines, and its object is to produce a machine which may be manipulated to place the laths upon the studding in the proper position and drive the nails through the laths into the studding by a simple movement of two handles to and from each other, the operation being otherwise automatic.

The invention consists essentially in a suitable frame carrying a holder and feeding mechanism for the laths, a holder and driving mechanism for the nails, means for holding the machine to the studding during the operation of driving the nails, and other means whereby the machine may be fed a distance equal to the combined width of a lath and the space between two laths, the entire operation being under the control of two handles which are moved to and from each other to perform the various operations described, and which take place during one complete movement of the handles toward each other and away from each other.

The invention will be fully understood from the following detailed description taken in connection with the accompanying drawings forming part of this specification, in which,—

Figure 1 is a plan view of the machine in operative relation to some studding shown in section; Fig. 2 is a section on the line x—x of Fig. 1, looking toward the right of that figure; Fig. 3 is a section on the line y—y of Fig. 1, looking toward the right of that figure; Fig. 4 is a detail sectional view of a portion of the feed mechanism for the whole machine; and Fig. 5 is a detail view of the gripping mechanism.

Referring to the drawings, there is shown a frame 1 of suitable shape having two end legs 2 and a central leg 3 projecting at right angles to the frame 1, all in the same direction. The central leg 3 is formed near its free end with gear teeth 4 on each side and terminates in an attenuated extension 5 central to the leg. Each leg 2 also terminates in an attenuated extension 6, and the ends of these extensions 5 and 6 lie in the same longitudinal plane.

Carried by the extensions 5 and 6 is a U-shaped bar or frame 7 having lateral matching passages 8 through the upturned ends of the bar receiving the attenuated ends 5 and 6 of the main frame. The bar 7 extends but a short distance beyond the part 6 of the frame 1 at one end, say the right end as viewed in Fig. 1, and for a longer distance beyond the part 6 at the other end, for a purpose which will presently appear. Centrally located with reference to the leg 3 of the frame 1 is a yoke 9 fast on the U-shaped bar 7 and comprising two arms 10 parallel with the leg 3 and a cross arm 11 connecting the outer ends of the arms 10 and having a central perforation 12 sufficiently large for the passage of the leg 3 and its teeth 4 therethrough. Seated in the trough of the bar 7 is a longitudinally sliding strip 13 having appropriately located with reference to the attenuated ends 5 and 6 of the legs 3 and 2 of the frame 1 a series of perforations 14 extending laterally across the bar and designed to carry a number of lath nails, there being one nail seated in each perforation, and the ends 5 and 6 are of such size as to pass through these perforations when brought into line with the perforations 8 in the up-turned sides of the bar or frame 7; and, as will hereinafter appear, the ends 5 and 6 constitute the means for engaging the heads of the lath nails and forcing them through the laths into the studding. About midway of the length of the strip 13 it has formed on its upper surface a series of ratchet teeth 15, to be hereinafter referred to.

Pivotally supported in the arms 10 of the yoke 9 are two levers 16 terminating at their outer ends in manipulating handles 17 and at their inner ends in segmental heads 18 projecting into the space between the arms 10 and there provided with gear teeth 19 arranged to mesh with the gear teeth 4 on the leg 3 of the frame 1, the arrangement being such that when the handles 17 are forced toward each other the leg 3 and frame 1, together with the legs 2 and parts 5 and 6, will be moved toward the bar 7, and when these handles 17 are moved away from each other the leg 3 and frame 1, together with the legs 2 and the attenuated portions 5 and 6, will all be moved away from the bar 7. It will be seen that when the handles 17 are caused to approach each other the attenuated portions 5 and 6, or, as they may be called, the nail punches, will engage the heads of nails located within those perforations in the strip 13 coincident with the perforations 8, and will drive them through the perforations 8 and through a lath that may be opposite the perforations 8 and into the studding back of the lath, when the lath is placed in position in a manner which will hereinafter appear.

Near the end legs 2 of the frame 1 and lying parallel therewith the U-shaped bar or frame 7 is provided with arms 20 having in the top thereof undercut longitudinal guiding slots 21 receiving rack bars 22 appropriately shaped to fit these undercut slots, and at one end each rack bar is formed with an up-turned portion 23 constituting a follower, as will hereinafter appear. The top surfaces of the arms 20 are in the horizontal plane above the arms 10 and the parts carried thereby, and on the top faces of the arms 20 rest a number of laths 24, indicated in dotted lines in Fig. 2, these laths being engaged by the follower 23. On the free end of each arm 20 and on the cross bar 11 of the yoke 9 there is formed an upturned bracket 25, in each of which is formed a journal bearing for a rock shaft 26. At each end the rock shaft is formed with a short rock arm 27 carrying a pawl 28 arranged to engage the teeth of the rack bars 22, and near the middle of this rock shaft 26 it is formed with another rock arm 29 connected by an appropriately bent link 30 with a bell-crank lever 31 fast on a stud 32 on the bar 7, and this bell-crank lever carries at its other end a pawl 33 arranged to engage the ratchet teeth 15 on the top of the longitudinally sliding strip 13. The link 30 has formed on one side of it a lug 34 in the path of a pin 35 on the adjacent head 18 of one of the manipulating levers 16. The construction is such that when the levers 16 are moved away from each other the pin 35 will engage the lug 34 and move the link 30 in a longitudinal direction to cause the pawl 33 to engage one of the teeth 15 and move the strip 13 in the proper direction, say, to the right in Fig. 1, to bring one set of perforations 14 in line with the nail punches 5 and 6, and at the same time the link 30 will rotate the shaft 26 in its journal bearings to a sufficient extent to cause the pawls 28 to engage the rack bars 22 and move them in a direction to feed the series of laths 24 forward toward the studding a distance equal to the thickness of a lath. The return movement of the parts carrying the pawls 28 and the pawl 33 may be effected by a suitably located spring.

During the operation of the machine it is necessary that it be held firmly to the studding to enable the nails to be driven and the parts to be properly manipulated. For this purpose there is attached to the under side of the bar or frame 7 by means of studs 36 a pair of gripping levers 37—37, each having at one end a pointed gripping tooth 38 and at the other end carrying a roller 39.

The leg 3 has wings 40 formed thereon on each side below the teeth 4, and these wings have their outer edges parallel with the plane of movement of the leg 3 for a distance and then these edges incline inwardly toward each other, as indicated at 60, to form cam faces. Beyond the cam faces and in line with the wings 40 are oppositely projecting fingers 61 extending from the forward end of the leg 3. Each of these fingers 61 and the corresponding cam face 60 form the bounds of pockets or recesses in which the rollers 39, which are adapted to move along the outer faces of the wings 40, will seat themselves, as will presently appear.

Secured by studs 62 to the under side of the frame 7 at points adjacent to the ends thereof are other gripping levers 63, one at each end of the frame 7, and these gripping levers 63 are provided with gripping teeth 38 like the gripping teeth of the levers 37. The ends of the levers 63 remote from the teeth 38 are connected by links 64 to eyes 65 formed on the levers 37 on the toothed side of their pivot point close to the teeth 38.

When the leg 3 is in its retracted position the rollers 39 are seated in the pockets between the cam faces 60 and the fingers 61. When the leg 3 starts forward these rollers are engaged by the cam faces 60 and spread so as to cause the teeth 38 to bite into the studding, and this continues so long as the rollers remain on the straight portions of the wings. On the return movement the grippers are released from the stud when the rollers pass down the inclined faces 60 into the pockets. It is when the nails are being driven that the grippers are caused to act, and, consequently, the machine is held firmly in place during this operation.

To move the machine into position to nail the next lath in order, there is provided a means which I will now proceed to describe. On the bar or frame 7 at points adjacent to two studs there are formed two brackets 41, each having an up-turned forked end 42 within the legs of which are formed lateral slots 43 for the reception of journal boxes 44 for the journals 45 of a toothed roller 46 provided at diametrically opposite points on its periphery with lugs 47 having faces 48 approximately tangential to the periphery of the roller. The two boxes 44 carried by each bracket 41 are mounted in or formed on the two legs 49 of the bifurcated end of an arm 50 turned twice at right angles to cross under the bar or frame 7 and having an extension 51 lying parallel thereto and mounted to slide in suitable brackets 52 fast on or formed on the sides of the frame 7 toward the main frame 1. The free ends of these extensions 51 are formed into elastic continuations 53 terminating in hooks 54, each hook being in the path of a lug 55 formed on the corresponding head 18 of a lever 16.

When the machine is in position with the gripping levers engaging a stud one of the faces 48 of a lug 47 on each roller 46 is in engagement with the side face of a stud toward the stud gripped by the levers 37 and it is there held by a spring 56 interposed in the slot 43 between one end wall of the same and the journal box 44.

When the levers 16 are moved away from each other toward the position where they cause the gripping levers to move out of engagement with the stud adjacent thereto, the lugs 55, just before the completion of the outward movement of the levers 16, engage the hooked ends 54 of the spring extensions 53 and thus the rollers 46 are moved away from the studs engaged thereby against the action of the springs 56. The machine will now move downward under the action of gravity and the rollers 46 will be caused to rotate by the light frictional contact of the lug 47 with the side face of the stud sufficiently to bring the toothed periphery of the roller into engagement with the stud as soon as the rollers are permitted to move into engagement with the stud under the action of the spring 56 by a slight movement of the operating levers 16 toward each other. The downward movement of the frame will continue until the diametrically opposite lug 47 comes in contact with the face of the stud and the machine is, by virtue of the strength of the springs 56, prevented from falling to a greater extent. A continued movement of the levers 16 toward each other will now cause the gripping levers to engage the studs and a fresh lath having in the meantime been fed forward and allowed to drop into place on the stud side of the frame 7 by a slight downward tipping of the operating side of the frame 1, the new lath will be nailed in place in the manner already described.

It will thus be seen that the machine provides a means whereby the laths are fed into place at appropriate distances apart and the nails are fed into position to be driven through the laths into the studs, and that the machine is secured to the studding in a manner to resist displacement during the nailing operation, all by the simple manipulation of the handles 17 of the operating levers to and from each other, and that this operation may be performed as rapidly as desirable with precision and certainty so long as the supply of laths and nails carried by the machine holds out. After the supply carried by the machine has been exhausted, the pawls may be lifted from the ratchet teeth and the rack bars 22 returned to their initial position to receive a fresh supply of laths, and the strip 13 may be removed and a fresh supply of nails placed therein, after which, on replacing the nail strip, the machine is ready to proceed with the nailing of the laths in place.

I claim:—

1. In a lathing machine, means for feeding the laths one at a time into position for nailing, means for feeding the nails one at a time to each point on the lath to be nailed, and means for simultaneously driving all the nails for a single lath.

2. In a lathing machine, means for feeding the laths one at a time to a position to be nailed, means for feeding all the nails for a single lath into position simultaneously, means for moving the entire machine a distance equal to the width of a lath and the space between the contiguous edges of two laths when in place, means for holding the machine to the studding, means for driving all the nails for a single lath simultaneously, and a single operating means connected to the feeding and nailing means to operate the same in proper sequence.

3. In a lathing machine, a longitudinally-moving, perforated, nail-carrying strip having ratchet teeth thereon, a lath feeding device having ratchet teeth thereon, nail punches arranged to move into and out of the perforations in the nail-carrying strip, operating levers therefor, a rock shaft carrying pawls in operative relation to the lath feeding device, a pawl in operative relation to the ratchet teeth on the nail-carrying strip, connections between the nail-strip operating pawl and the rock shaft, and connections between the operating levers and the nail and lath feeding mechanisms for feeding the laths and nails and for driving the nails in proper sequence.

4. In a lathing machine, a nail-carrying strip movable step-by-step to present the nails to be driven, a nail driving frame movable with relation to the nails to be driven, a lath feeding mechanism, grippers for holding the machine to the studding, feeding mechanism for the machine for determining the distance between the laths, operating levers for the nail-driving mechanism, connections between the operating levers and the nail and lath feeding mechanisms, connections between the operating levers and the grippers, and connections between the operating levers and the spacing mechanism, all arranged to be operated in proper sequence by the movement of the operating levers to and from each other.

In testimony that I claim the foregoing as my own, I have hereto affixed my signature in the presence of two witnesses.

ROBERT R. ZAHNTER.

Witnesses:
  MICHAEL B. KANE,
  HUGH F. KANE.